United States Patent [19]

Meng

[11] Patent Number: 5,323,735
[45] Date of Patent: Jun. 28, 1994

[54] SQUIRREL-PROOF BIRD FEEDER

[75] Inventor: Heinz Meng, New Paltz, N.Y.

[73] Assignee: Joseph B. Taphorn, Poughkeepsie, N.Y. ; a part interest

[21] Appl. No.: 380,434

[22] Filed: Jul. 17, 1989

[51] Int. Cl.⁵ .................................................. A01K 5/00
[52] U.S. Cl. ................................. 119/52.3; 119/57.9
[58] Field of Search .............. 119/52.2, 52.3, 57.8, 119/57.9

[56] References Cited

U.S. PATENT DOCUMENTS

| | | | |
|---|---|---|---|
| D. 249,075 | 8/1978 | Platt | 119/57.9 |
| 888,811 | 5/1908 | Jencks | 119/52.2 |
| 2,707,454 | 5/1955 | Wilkinson | 119/57.9 |
| 3,022,768 | 2/1962 | Lynch | 119/52.3 |
| 3,086,499 | 4/1968 | Dilley | 119/57.9 |
| 3,164,130 | 1/1965 | Curtis et al. | 119/57.9 |
| 3,301,217 | 1/1967 | Prowinsky | 119/57.9 |
| 4,434,745 | 3/1984 | Perkins et al. | 119/57.9 |
| 4,462,337 | 7/1984 | Kilham | 119/57.9 |
| 4,632,061 | 12/1986 | Tucker et al. | 119/57.8 |
| 4,753,195 | 6/1988 | Maggio | 119/52.2 |
| 4,867,104 | 9/1989 | Vandiver | 119/52.3 |

*Primary Examiner*—Paul J. Hirsch
*Attorney, Agent, or Firm*—Joseph B. Taphorn

[57] ABSTRACT

A bird-feeder, which precludes gray squirrel access to seeds therein, mounts on a rectangular platform gnaw-resistant, hollow, ⅜″ aluminum bars across the front and partially back along the sides and whose surfaces are spaced from adjacent bars 1¼″. The upper ends of the bars are received in an open frame closed off by a plexiglass roof. A generally interior hopper extends across the back of the feeder to constitute its rear wall and to gravity feed seed onto the platform surface constituting the floor of the feeder. The hopper is pivoted to the platform for swinging movement outward to a loading position. Solid panels on the rear portions of the two sides present resistance also to wind action and seed scattering.

8 Claims, 4 Drawing Sheets

SQUIRREL-PROOF BIRD FEEDER

BACKGROUND OF THE INVENTION

1. Field of the Invention

This invention relates to bird feeders, and more particularly to a bird feeder that resists marauding by gray squirrels.

2. Description of the Prior Art

The fondness of gray squirrels for seeds in bird feeders is well known. What is not well known is a bird feeder that successfully resists the destructive acts of those predators in their efforts to get at the feeder seeds, and that saves the seeds for birds such as chickadees, nuthatches, titmice, and house and gold finches.

SUMMARY OF THE INVENTION

A primary object of the invention is to provide a bird feeder that resists predations by gray squirrels.

Another object of the invention is to provide a squirrel-proof bird feeder which also provides a protected environment for feeding birds. A related object is to provide such a protected environment which nevertheless receives full daylight.

Still another object of the invention is to provide a squirrel-proof bird feeder which also supplies the seeds in a ground simulating environment, to the feeding birds.

Yet another object of the invention is to provide a squirrel-proof bird feeder wherein the stored seeds are protected from being blown away by the wind or dampened by wind-blown snow.

A further object of the invention is to provide a squirrel-proof bird feeder that can be easily loaded with seeds.

In accordance with the invention, a squirrel-proof bird feeder has a rectangular platform which mounts on its periphery on all but one side vertical gnaw-resistant bars spaced just close enough to preclude the passage of gray squirrels, but permitting the passage of small birds. The upper ends of the metal bars are mounted in an open framework which supports a transparent plexiglass roof. The one side of the platform hingedly mounts the lower end of an interiorily located, V-shaped seed hopper, so that the upper end of the hopper can be swung exteriorly of the roof for the easy loading of seeds. The lower end of the front wall of the V-shaped hopper terminates above the platform to gravity dispense seed in a line across the back of the feeder as birds eat the seed which has already reached the platform. For a distance extending generally forward to the front edge of the hopper and juxtaposed to the back bar on each side, the rear portions of each side are formed of a panel of solid material to prevent the wind blowing of seeds away and of snow into the hopper, as well as to preclude squirrel entry thereat. The solid panel wall also reduces bird scattering of the seed.

BRIEF DESCRIPTION OF THE DRAWINGS

The above and other objects, features and advantages of the invention will become apparent from a consideration of the following description of an illustrative embodiment thereof, when taken together with the accompanying drawings wherein.

DETAILED DESCRIPTION OF THE PREFERRED EMBODIMENT

Referring now to drawings, a squirrel-proof bird feeder is shown as including a rectangular platform 10 formed of wood or other solid material. Mounted about the periphery of the platform, in holes formed in its upper surface, are hollow aluminum bars 12 which are gnaw-resistant to squirrels. The bars may be of ⅜" diameter, and the holes in the platform are of such dimension as to snugly receive them. The holes are so spaced from each other that the outside edges of adjacent bars are spaced 1¼". This dimension precludes adult gray squirrels, the usual gray squirrel during the winter bird-feeding season, from passing through.

The upper ends of the bars 12 are snugly received in corresponding holes formed in the lower surface of a rectangular open frame 14. The bars 12 extend across the front (FIG. 2) of the feeder, and partially back on each side, to define a barrier to gray squirrels while permitting the passage to small birds such as chickadees, nuthatches, titmice, and house and gold finches.

Figure 1:
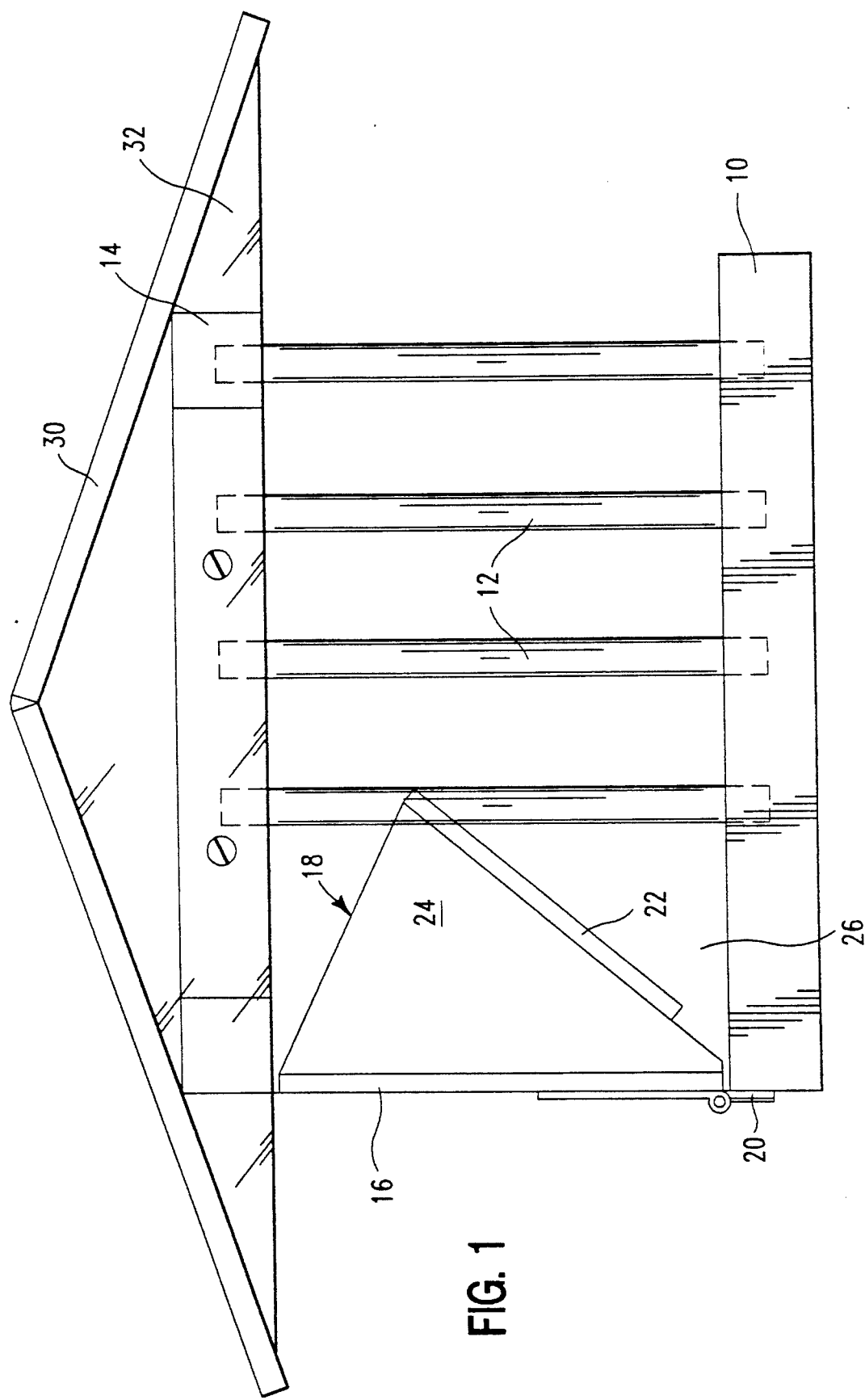
FIG. 1 is a view of the left side of a squirrel-proof bird feeder constructed according to the invention.

The rear wall of the feeder is formed by the rear wall 16 (FIG. 4) of a seed hopper generally indicated by the numeral 18 (FIG. 1). The hopper rear wall 16 is swingably mounted on the platform 10 by hinges 20 screwed to it and to the backside of the platform 10 so that the pivot point is at the upper rear edge of the platform.

The hopper 18 includes, besides its back wall 16, a slanted front wall 22 (FIG. 1) and side walls 24, to define a seed hopper V-shaped in cross-section. The front edge of the hopper 18 is lower than its back edge, to accommodate its outward swinging movement on the hinges 20. The lower edge of the hopper front wall 22 terminates a distance above the surface of the platform 10 and a distance from the rear wall 16 to define a longitudinal opening through which seed may flow under the influence of gravity when seed already on the surface of the platform therebeneath is removed by hungry birds.

Figure 4:
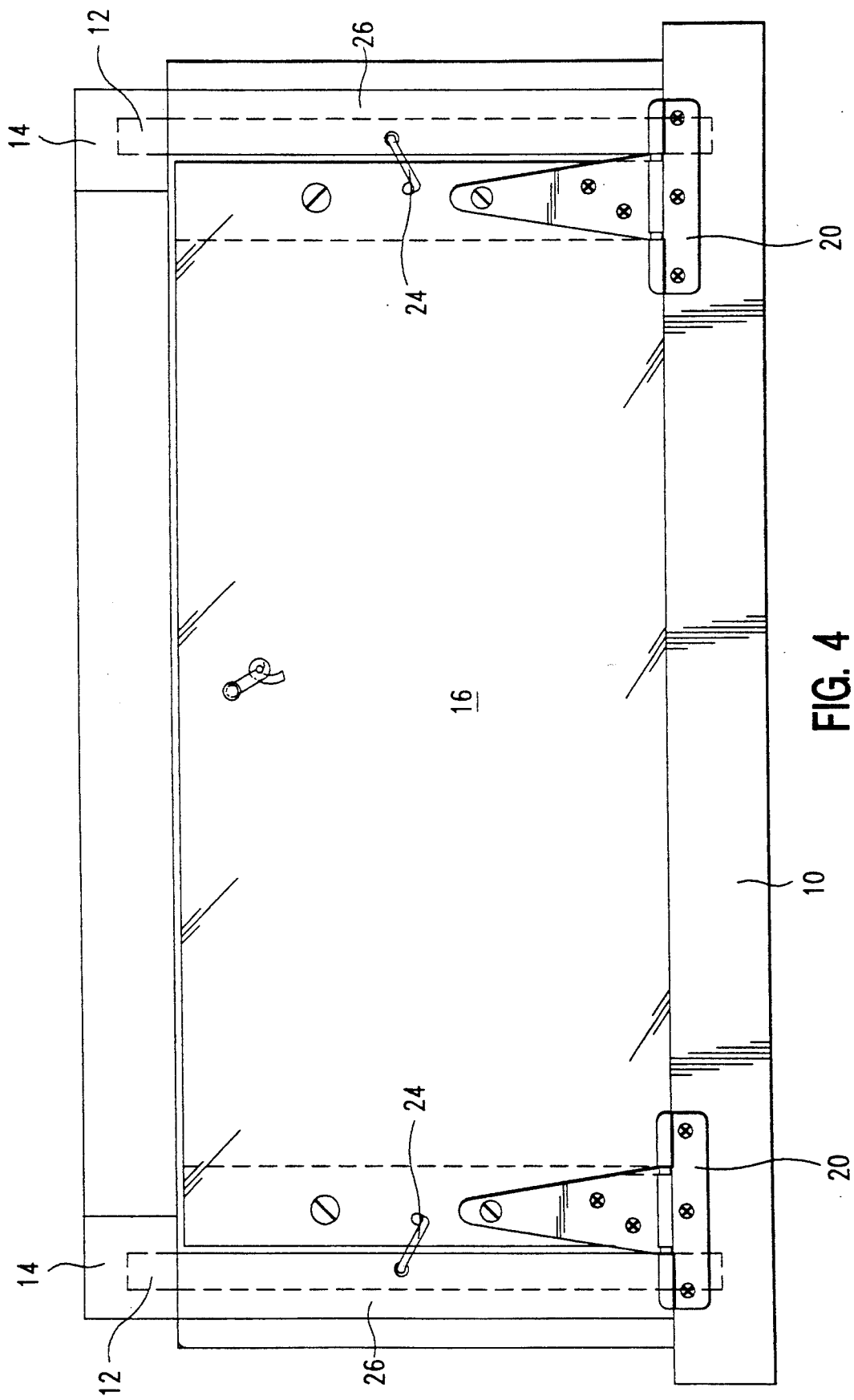
FIG. 4 is a view of the back of the feeder of FIG. 1, without the roof.

It should be observed that the normal tendency of the hopper 18 will be to rest interiorly of the feeder since its center of gravity will be disposed forwardly of the hinges 20, with or without seed in the hopper. Hinges 20 may serve to limit the interior position of the hopper 18 and hence the position of the feeder rear wall 16; alternatively, suitable stops may be appropriately employed. Outward movement of the hopper, as under severe wind conditions, may be precluded by latches 24 (FIG. 4).

Figure 3:
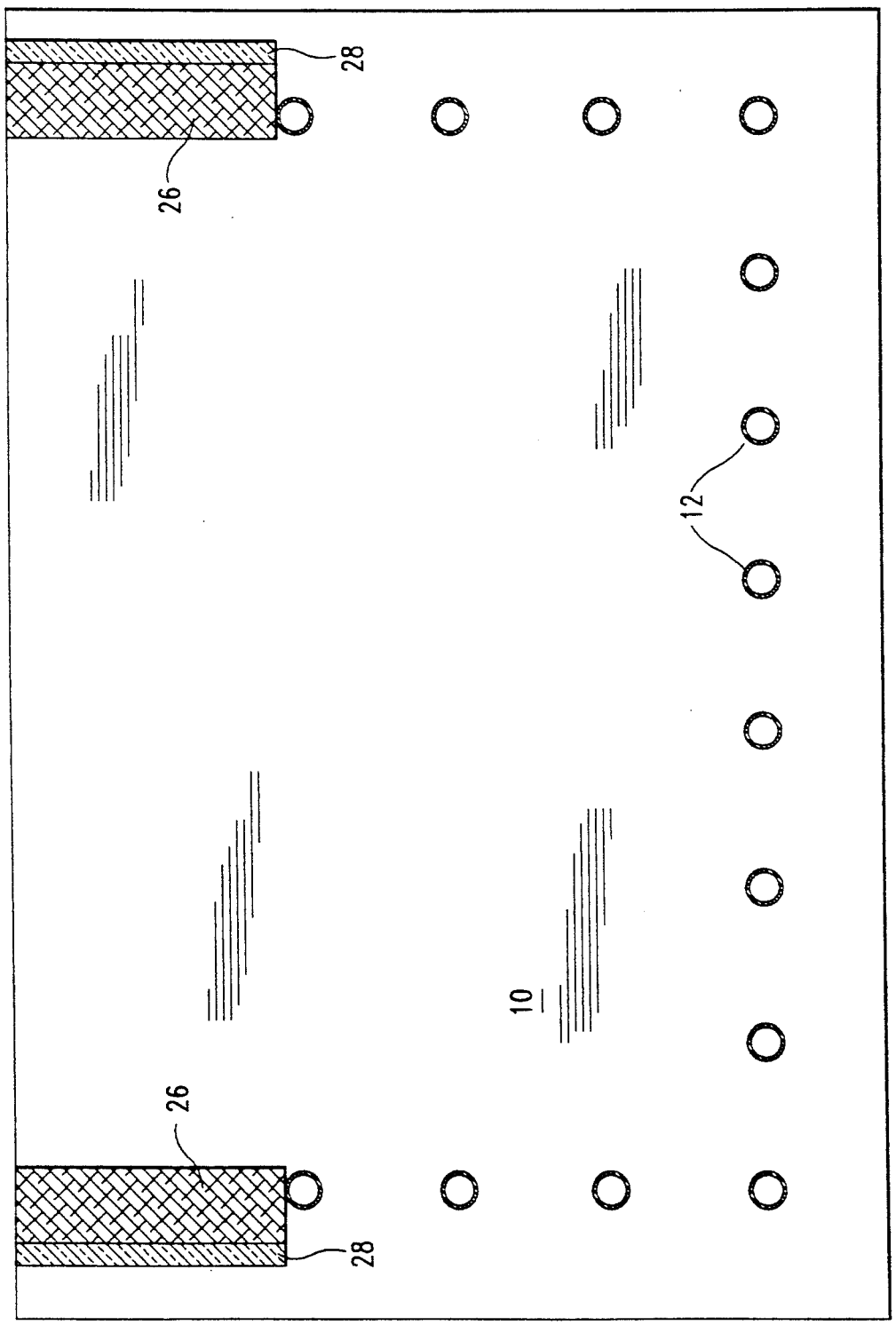
FIG. 3 is a sectional view, taken along the lines 3—3 of FIG. 2, and showing the floor plan of the bird feeder.

The sides of the feeder, at the rear, are formed of solid panels 26 (FIGS. 1 & 3). The panels are juxtaposed next to the last vertical bars 12 on the sides, and extend to the rear side of the platform 10. The panels effectively block wind action from scattering the seed, and birds from knocking the seed off the platform. The panels aid the bars 12 in providing rigidity to the bird feeder super structure to which they are suitably secured. They are also suitably secured to the platform 10. The panels 26 may be made of wood; they may be covered with plexiglass 28 if additional security against squirrel penetration is desired. The panels 26 may swingably mount the latches 24.

As best seen in FIG. 1, a peaked roof 30 formed of plexiglass to admit light into the interior of the feeder, may be mounted on the rectangular framework 14. Plexiglass sides 32 (FIGS. 1 & 2) are suitably secured to the edges of the peaked roof to preclude squirrel entrance there.

Figure 2:
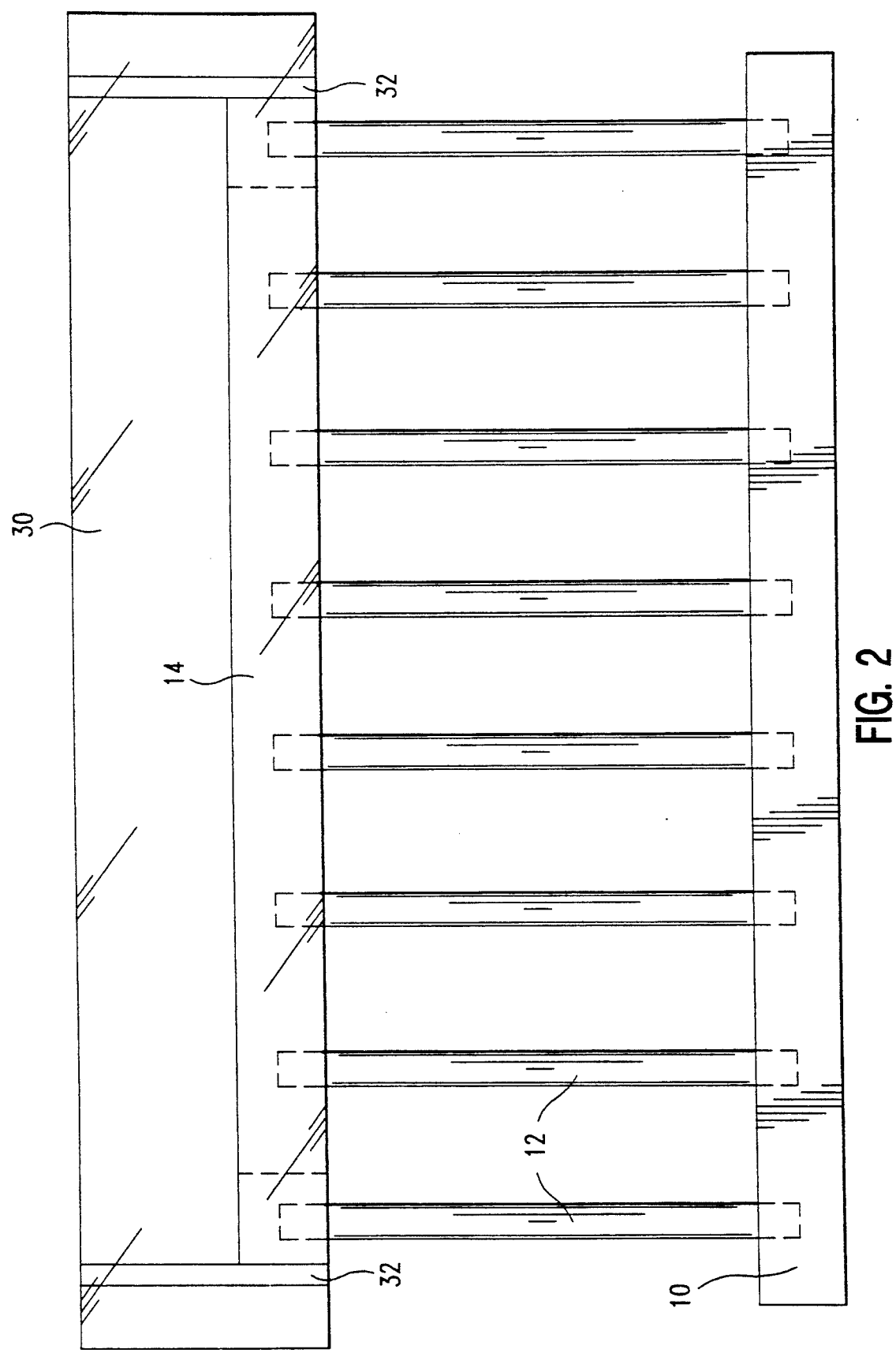
FIG. 2 is a view of the front of the bird feeder of FIG. 1, with the roof in place.

It will be observed from a viewing of FIGS. 1, 2, and 3 that the platform 10 extends beyond the metal bars 12 a distance sufficient to present landing perches for birds. Of course, some species will land on the vertical bars 12, treating them as branches prior to passing through the bars into the lit, but protected environment of the interior of the bird feeder where they may relaxedly feed themselves in natural fashion from the surface of the platform 10 (floor of the bird feeder).

The feeder may be mounted in a yard in any number of conventional ways. Typically, a pole mount would be secured to the underside of the platform 10.

In use, the hopper 18 would be swung outwardly after swinging to unlocking position the latches 24 to expose the upper end of the hopper for filling with seed. Thereafter, the hopper would be swung inwardly and the latches 24 restored. Seed would flow out of the bottom of the hopper between the plates 16 and 22 onto the surface of the platform 10 (floor of the feeder). Birds would land on the exterior edges of the platform 10 or on the bars 12. If small enough, they will penetrate the feeder between the bars 12 to nourish themselves on the floor of the feeder. The floor will be lit by light passing through the plexiglass roof 30 and between the bars 12. Within the feeder, the small birds will be protected from the elements and from birds of prey and from cats; they will also be safe from being pushed aside by larger birds.

But most importantly of all, a supply of seeds will be saved for the small birds, by the inability of gray squirrels to penetrate the interior of the feeder and devour and scatter the seed.

While the invention has been described with reference to a particular embodiment, it should be realized that the description is illustrative only, and that the invention can be incorporated in many other embodiments. Various modifications can be made without departing from the spirit of the invention, and it is intended that the scope of the invention only be limited by the appended claims.

What is claimed is:

1. A squirrel-proof bird feeder including a platform, gnaw-resistant vertical bars spaced from each other about the periphery of said platform so as to preclude the passage of gray squirrels but admitting small birds, and means cooperating with the upper ends of the vertical bars to close-off the top side of the feeder to squirrel entry, including also a hopper feeding seed onto the surface of the platform, wherein the hopper may be moved exteriorly of the feeder for loading with seeds, wherein the back wall of the hopper constitutes the back wall of the feeder.

2. A squirrel-proof bird feeder according to claim 1, wherein the back wall of the feeder hopper is hinged to the platform.

3. A squirrel-proof bird feeder including a rectangular platform, gnaw-resistant vertical bars spaced about the platform periphery on three sides, said bars being spaced from each other a distance sufficient to preclude the passage of gray squirrels but permitting the passage of small birds, an open rectangular frame securing the upper ends of said bars, a peaked transparent roof mounted on said frame, sides fixed to said roof to preclude entrance of squirrels under the roof peak to the feeder interior, and a hopper for feeding seeds onto the surface of said platform, the rear wall of the hopper constituting the rear wall of the feeder.

4. A squirrel-proof bird feeder according to claim 3, wherein the rear wall of the hopper is pivoted to the platform's upper rear edge to allow outward swinging of the hopper.

5. A squirrel-proof bird feeder according to claim 4, wherein the rear portion of each side wall is a solid panel to protect seed fed onto the surface of the platform from being blown away.

6. A squirrel-proof bird feeder according to claim 4, wherein the rear portion of each side wall is a solid panel to protect the seed in the hopper from windblown snow.

7. A squirrel-proof bird feeder according to claim 4, wherein the distance that the bars are spaced from each other is one and one-fourth inches.

8. A squirrel-proof bird feeder having gnaw-resistant bars spaced from each other so as to preclude the passage of gray squirrels but admitting small birds, wherein the gnaw-resistant bars are spaced from adjacent bars a distance of one and one-fourth inches.

* * * * *